May 19, 1959

C. VAN AUSDALL 2,886,977

AUTOMATIC TRANSMISSION

Filed Dec. 13, 1955

INVENTOR,
CARL VAN AUSDALL
BY Joseph F. Zugelter
Atty.

2,886,977

AUTOMATIC TRANSMISSION

Carl Van Ausdall, Bradenton, Fla.

Application December 13, 1955, Serial No. 552,768

7 Claims. (Cl. 74—217)

This invention relates to an automatic transmission, or speed changer, of a type depending for its operation upon the use of centrifugal clutches in the transmission of motive power.

An object of the invention is to provide means in an automatic transmission, for achieving an unusually smooth change of drive ratio between the prime mover and the load shaft as the speed of the prime mover varies between certain limits.

Another object is to provide in a device of the character stated, improved means of a durable and simplified nature, for achieving the desired transmission of power with a minimum of wear and servicing of parts.

A further object of the invention is to provide an automatic transmission so constructed as to greatly facilitate and expedite manufacture and assembly, resulting in a substantial cost advantage initially, and in subsequent servicing when required.

The foregoing and other objects are attained by the means described herein and illustrated upon the accompanying drawings, in which.

Figure 1:
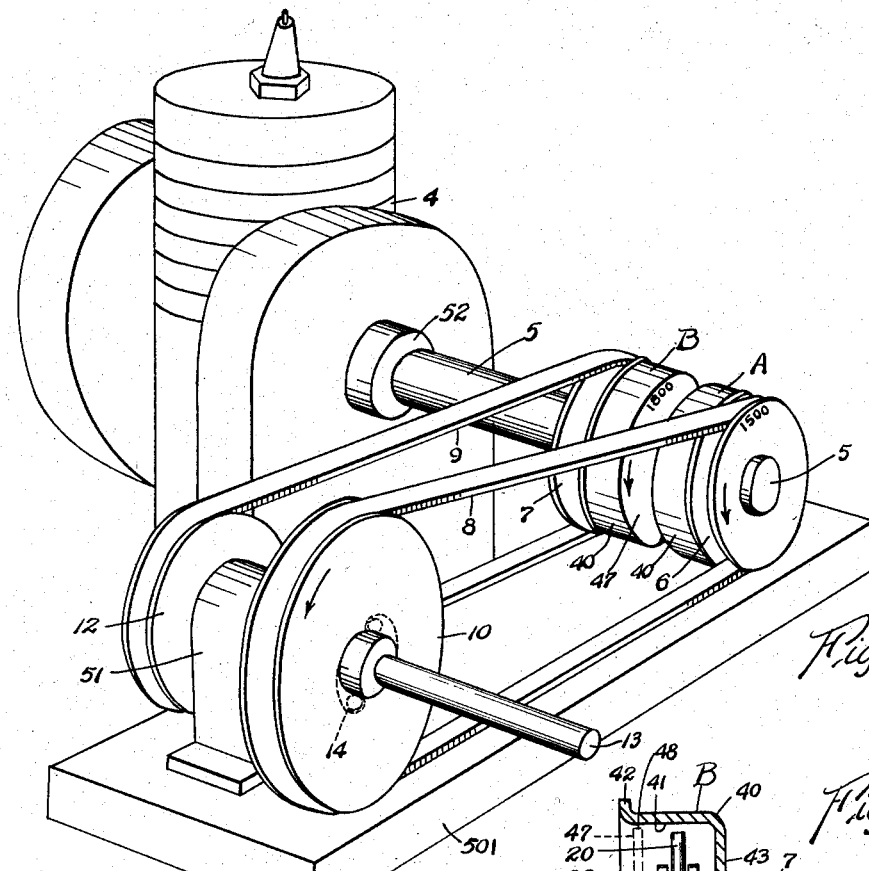
Fig. 1 is a perspective view of the automatic transmission or speed changer embodying the invention.

The automatic transmission herein disclosed, is of the type in general illustrated and described in the United States Patent of D. C. Orcutt et al., No. 2,641,137, dated June 9, 1953, and is distinguishable therefrom in certain respects to be explained, for improving the performance and the serviceability thereof while at the same time reducing the cost of manufacture and assembly. One of the improvements incorporated in the present device, involves elimination of a momentary hesitation or dead spot in the changeover from one speed to another, which invariably resulted in jerky operation and destructive strain imposed on the various elements of the prior transmissions and on any running gear associated therewith. The present transmission device as constructed betrays no changeover from one speed to another at any time, for the reason that the drive is at no time interrupted in the course of the changeover.

With reference to the accompanying drawing, the combination comprises in general an engine or motor 4 having a driving shaft 5 in driving relationship with a pair of centrifugal clutches A and B. The clutches may be mounted directly upon shaft 5, and each clutch may include a pulley 6 and 7 adapted to accommodate the endless belts 8 and 9. Belt 8 drives a pulley 10, whereas belt 9 drives a second pulley 12, these pulleys being both mounted on a load or driven shaft 13.

By preference, pulley 10 is of larger diameter than pulley 12, wherefore these pulleys will tend to drive the shaft 13 at different speeds, assuming that 6 and 7 are of equal diameters. This speed differential is compensated for, by providing the pulley 10 with an overrunning clutch indicated generally by the character 14. Thus, it will be understood that the larger pulley 10 will lag in rotation, as long as pulley 7 drives the pulley 12 which is fixed upon shaft 13.

Clutch A, which is of the centrifugal type, may be set to engage automatically at some predetermined speed, say 1500 r.p.m. of the engine shaft 5. The load or driven shaft 13 therefore will rotate at a relatively slow speed determined by the relatively large diameter of pulley 10. Then, as the engine shaft speed is increased, say to 1800 r.p.m. the other centrifugal clutch B will engage, thereby driving the pulley 12 and its shaft 13 at a speed greater than the pulley 10 can drive it, with the result that the overrunning clutch 14 allows the pulley 10 to overrun. Thus, at speeds of 1800 r.p.m. and over, the pulley 7 of clutch B performs the driving of shaft 13 while pulley 10 runs idle with respect to shaft 13, though clutch A is engaged to positively drive its own pulley 6.

Assuming now that the load on shaft 13 becomes sufficient to slow the engine speed below 1800 r.p.m. this will result in automatic disengagement of clutch B; therefore, the drive will revert back to clutch A, pulley 6, and large pulley 10, affording a slower speed drive for shaft 5 favorable to relieving engine labor. If thereafter the load on shaft 13 is relieved, the engine may pick up speed and upon reaching 1800 r.p.m. the clutch B will take over the drive through pulleys 7 and 12, which places the transmission again in "high speed" condition.

The foregoing explanation is general, and should afford an understanding of the functional aspect of the device, apart from the details.

The motor or engine 4, referred to as the prime mover, will ordinarily be equipped with a throttle or similar speed control device, for selectively operating the prime mover at speeds between an idle and a maximum high speed. In the example above given, the idling speed would be below 1500 r.p.m. to avoid clutch engagement. However, at 1500 r.p.m. of the shaft 5, engagement of centrifugal clutch A would occur, whereas at 1800 r.p.m. of said shaft, the other centrifugal clutch B would engage in addition, so that both said clutches are seen to be in engagement or in driving condition, at all speeds in excess of the engaging speed of the clutch having the higher rating. Otherwise stated, it is important to note that both clutches are engaged and in condition to drive, at all speeds in excess of the engaging speed of the clutch having the higher rating. Accordingly, in the event of a gradual increase of load on shaft 13, to the extent of reducing the drive shaft speed to 1800 and below, clutch B will disengage and the load will be taken immediately by clutch A without hesitation, for the reason that clutch A was already engaged when clutch B reelased the load. That is, no recovery of engine speed is required for placing clutch A in driving condition as clutch B releases the load thereto.

Clutches A and B with great convenience and advantage may be made identical, with the single exception of a slight difference in the power of their inner springs 15, to establish their differing engaging speeds. Both clutches have the same shaft diameter, and may be keyed to the driving shaft with a common key 16, if desired. Assembly of the clutches upon the motor shaft 5, therefore, is a simple and inexpensive procedure requiring only one type of clutch.

Figure 2:
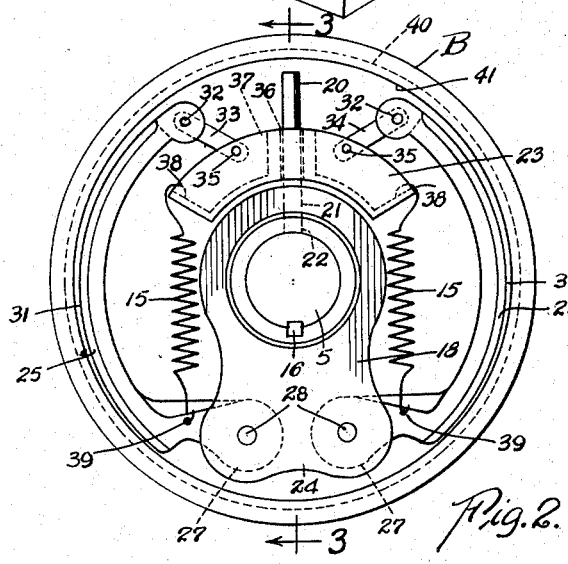
Fig. 2 is a front elevational view of a centrifugal clutch such as may be employed as an element of the transmission device.
Figure 3:
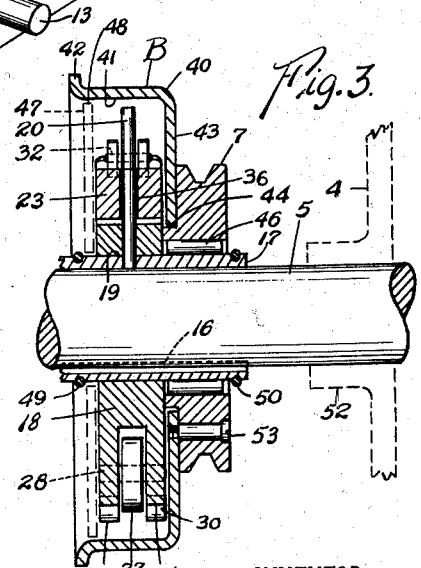
Fig. 3 is a cross-sectional view taken on line 3—3 of Fig. 2.

Describing clutch B, Figs. 2 and 3, it is noted that 17 indicates a sleeve upon which the clutch proper is built, the sleeve serving to mount the clutch upon the drive shaft 5. By means of the key 16 or other suitable expedient, the mounting sleeve is caused to rotate with the drive shaft. Sleeve 17 has fixed thereto a rotor block 18 which is elongate and symmetrical in form, and has formed therein near one end a transverse bore 19 to snugly receive the mounting sleeve 17. To avoid rotation of the rotor block 18 relative to the sleeve, these parts may be suitably locked together, as by means of a post 20 driven into the aligned bores 21 and 22 of the rotor block and the mounting sleeve, respectively. This post 20 extends radially of the sleeve 17 along the major axis of the rotor block, and may perform the function of a guide for the shiftable toggle block 23, later to be described.

At the outer or swinging end 24, the rotor block is suitably formed or machined to provide pivotal mountings for a pair of elongated arcuate clutch shoes 25 and 26. Each shoe may be provided with a flattened pivot head 27 pierced or transversely bored to receive a pivot member or pin 28. The width of each shoe may approximate the thickness of the rotor block 18, and the shoes are disposed in the plane of said block. The pivot heads 27 of the shoes are reduced in thickness, so as to fit loosely between the perforated spaced ears 29 and 30 of the rotor block. The ears 29 and 30, and their pivot members 28, are equidistant from the major axis of the rotor block, which axis in Fig. 2 is vertical. It may be noted that the guide post 20 includes the major axis of the rotor block.

Each clutch shoe 25 and 26 includes an arcuate friction face or area 31 of an extent approximating a quarter circle, and at one end of the shoe is formed the pivot head 27. The opposite or tail end of each shoe may be furnished with a pivot 32 providing a connection for the outer ends of a pair of toggle links 33, 34. The inner ends of the toggle links are pivoted to the weighted toggle block 23 at pivots 35, 35, the pivots being at opposite sides of the guide post 20, and equidistant therefrom.

The toggle block 23 is preferably, though not necessarily, arcuate in form, and has a central radial aperture or bore 36 for loosely accommodating the guide post 20 upon which the toggle block is adapted to slide. Where the link pivots 35, 35 pass through, the toggle block may be recessed or hollowed out as shown at 37. It will be understood that the toggle links 33—34 may pivot at the locations 35—35, as the toggle block shifts vertically along the post 20, under the control of the springs 15—15. One end of each spring is anchored to the toggle block at 38, whereas the opposite ends are anchored to a relatively stationary member, such as the pivot ends of the shoes at 39.

Surrounding the clutch shoes and all the parts to which they are connected, is a cylindrical body member or drum 40, preferably of cup shape, providing an inner friction area or face 41 to be engaged by the clutch shoes 25 and 26 when the latter are expanded outwardly by the action of centrifugal force and of the toggle and links 33—34. The body member or drum may be inexpensively formed from sheet metal, preferably steel or a steel alloy, the formation of the body member being performed as a single pressing or drawing operation. In the course of formation, the cup-shaped body member may easily be provided with an outwardly extending continuous reinforcing flange 42, to avoid distortion of the body member by the expansive action of the shoes. The body member may include also a solid circular wall 43 centrally apertured at 44. Upon the outer face of wall 43 may be formed or applied the power transmission element or pulley 7. The pulley has an anti-friction bearing mounting upon one end of sleeve 17, so that the sleeve may rotate with shaft 5 without any strong tendency to rotate the pulley 7 and the body member 40 thereto attached. For this purpose, a roller bearing 46 or its equivalent may be interposed between the power transmission element 7 and the mounting sleeve 17. As will be understood, the parts 40 and 7 may be held stationary, while all the remaining parts of the clutch rotate with the drive shaft 5.

In Fig. 3 there is shown by means of broken lines 47, a circular solid plate of metal or other suitable material applied over the outer end of the mounting sleeve 17 to preclude entry of dirt, moisture, or other foreign substances into the working parts of the clutch. The outer peripheral edge 48 of plate 47 may extend very close to the inner face 41 of the body member, but should not be in contact therewith. At 49 and 50 are indicated slip rings or other retainers for holding in place the cover plate 47 and the bearing 46.

As will be understood, the coiled tension springs 15 yieldingly restrain the toggle block 23 against outward displacement until centrifugal force of a predetermined value is available for engaging the clutch. The torsional force of the springs is such that centrifugal force acting upon the toggle block and shoes, will overcome the restraining force of the springs, at a predetermined or preselected speed of rotation of the drive shaft 5. As the toggle block moves outwardly by the action of centrifugal force, the links 33—34 are caused to approach a condition of alignment one with the other, thereby to move the shoes outwardly against the drum with a wedging force that progressively increases in value, thereby to engage the clutch.

From the foregoing, it will be understood that the clutches A and B of Fig. 1 easily can be conditioned, by the proper selection of springs 15, to engage and disengage at different speeds of rotation to suit the requirements of the automatic transmission. For any further details of the clutch, reference may be had to my issued U.S. Patent No. 2,696,282, dated December 7, 1954.

In mounting the clutches A and B upon the shaft 5, a single sleeve 17 may be used which is common to both clutches, that is, the single sleeve may be of sufficient length to extend through both clutches and carry two posts 20, one for each clutch. As an alternative construction, each clutch may embrace its own individual sleeve 17 and each sleeve may have a keyed connection with shaft 5. The single sleeve arrangement is preferred, however, as it makes possible the mounting of both clutches upon motor shafts which are limited as to length and therefore unsuited for supporting two sleeves individually. When the clutches are mountable upon the motor shaft in very closely spaced relationship, the protective plates 47 may be omitted, as will be understood.

It may here be noted that the transmission shaft 13, and pulleys 10 and 12, may be mounted on a suitable base 501 of such form and size as any particular situation may demand. A suitable bearing for the load or driven shaft 13 is indicated at 51. In most instances, no bearing other than the motor shaft bearing 52 is needed for support of the clutches A and B, which are detachably fixed upon the shaft 5. The overrunning clutch indicated generally and conventionally by the character 14, may be of any approved type suitable for the duty required, although a ball type clutch is indicated by way of example.

It is pointed out particularly, also, that the power transmission elements 6, 7, 10 and 12 need not be necessarily in the form of pulleys as shown. They might as well be in the form of sprockets, or even gears, since belt slippage is not required in the operation of the device. Also, while it is convenient to make the power transmission elements 6 and 7 of equal diameters as shown, this is not a necessary requirement. The relative diameters of all the pulleys or transmission elements may be altered to suit the requirements of any particular transmission problem or situation. Moreover, the type of centrifugal clutches employed may be subject to change or selection on the part of the builder, notwithstanding the fact that the type of centrifugal clutches herein suggested for use in the combination has been found highly satisfactory.

While in the disclosure of the present apparatus only two changes of speed are provided for, it should be obvious that the motor shaft, or any drive shaft, could be provided with three or more clutches arranged to drive a series of overrunning pulleys such as 10, of varying diameters, to effect a greater procession of speed changes than the present example contemplates. The matter is one of simply adding clutches and pulleys in the manner taught herein.

The foregoing and various other modifications and changes in structural details of the device may be resorted to, within the scope of the appended claims, without departing from the spirit of the invention.

What I claim is:

1. Automatic transmission apparatus for application to the rotary driving shaft of a variable speed prime mover, said apparatus comprising in combination, a pair of centrifugal clutches each including a body member rotatably supported upon said driving shaft, and a pair of driving pulleys each fixed to one of said body members, centrifugal expansive means incorporated in said centrifugal clutches and fixed upon said driving shaft to engage the body members and enforce rotation of the driving pulleys and the body members at predetermined speeds of rotation of the driving shaft and the expansive means thereto attached, a load shaft and means for supporting the load shaft for rotation, a high speed driven pulley fixed to the load shaft, and an endless belt transmitting rotation of one centrifugal clutch pulley to said high speed driven pulley, a low speed driven pulley on the load shaft, an endless belt transmitting rotation of the other centrifugal clutch pulley to said low speed driven pulley, and an overrunning clutch intermediate the low speed driven pulley and the load shaft, for establishing a driving connection between said low speed driven pulley and the load shaft only when the speed of rotation of the low speed driven pulley tends to exceed that of the load shaft in the same direction.

2. Automatic transmission apparatus for application to the rotary drive shaft of a variable speed prime mover, said apparatus comprising in combination, a driven shaft, a low speed centrifugal clutch on the drive shaft including power transmission means to establish a driving connection between the shafts at a predetermined speed of the drive shaft, a high speed second centrifugal clutch on the drive shaft, said second centrifugal clutch comprising a body member rotatable upon the drive shaft, a drive pulley secured to the body member for rotation with the body member, and a set of centrifugally expandable shoes driven by the drive shaft always at drive shaft speed, said shoes being expandable to engage the body member and enforce unitary rotation of the body member with the shoes and drive shaft, a high speed driven pulley on the driven shaft, an endless belt trained over the clutch drive pulley and the high speed driven pulley, for establishing a driving connection from one of said pulleys to the other, and an overrunning clutch included in the power transmission means of the low speed clutch, for terminating the driving connection between said low speed clutch and the driven shaft only when the speed of rotation of the driven shaft tends to exceed the speed imparted thereto by the low speed clutch.

3. Automatic transmission apparatus for application to the rotary driving shaft of a variable speed prime mover, said apparatus comprising in combination, a driven shaft, means including a low speed centrifugal clutch mounted upon and driven by the driving shaft and responsive to a predetermined speed of the driving shaft to establish a driving connection between the shafts, other means including a high speed second centrifugal clutch mounted upon the driving shaft to establish a driving connection between said shafts, said second centrifugal clutch comprising a body member rotatable upon the driving shaft, and a set of centrifugally expandable shoes driven by the driving shaft always at driving shaft speed, to expand against the body member for establishing the second mentioned driving connection, and means on said driven shaft for discontinuing the driving connection established by the first named means when the second named means establishes a driving connection.

4. Automatic transmission apparatus for application to the rotary driving shaft of a variable speed prime mover, said apparatus comprising in combination, a driven shaft, means including a low speed centrifugal clutch mounted upon and driven by the driving shaft and responsive to a predetermined speed of the driving shaft to establish a driving connection between the shafts, other means including a high speed second centrifugal clutch mounted upon the driving shaft and responsive to a predetermined speed of the driving shaft to establish a driving connection between said shafts, said second centrifugal clutch comprising a body member rotatable upon the driving shaft, and a set of centrifugally expandable shoes driven by the driving shaft always at driving shaft speed, to expand against the body member for establishing the second mentioned driving connection, and means operative upon establishment of the second driving connection, to disable the driving connection first mentioned.

5. Automatic transmission apparatus for application to the rotary driving shaft of a variable speed prime mover, said apparatus comprising in combination, a driven shaft, means including a centrifugal clutch mounted upon and driven by the driving shaft and responsive to a predetermined speed of the driving shaft to establish a driving connection between the shafts, other means including a second centrifugal clutch having a set of centrifugally expandable shoes supported and driven by the driving shaft always at driving shaft speed, and responsive to a predetermined higher speed of the driving shaft to establish a driving connection between said shafts, and means on said driven shaft for discontinuing the driving connection established by the first named means when the second named means establishes a driving connection.

6. Automatic transmission apparatus for application to the rotary driving shaft of a variable speed prime mover, said apparatus comprising in combination, a driven shaft, a pair of centrifugal clutches, means including one of said clutches mounted upon and driven by the driving shaft and responsive to a predetermined low speed of the driving shaft to establish a driving connection between the shafts, other means including the other centrifugal clutch mounted upon and driven constantly at driving shaft speed by the driving shaft, responsive to a predetermined relatively higher speed of the driving shaft to establish a driving connection between the shafts, and means on said driven shaft for discontinuing the driving connection established by the first named means when the second named means establishes a driving connection.

7. Apparatus as specified in claim 6, in which a single sleeve common to both clutches mounts the clutches upon the driving shaft.

References Cited in the file of this patent

UNITED STATES PATENTS

| | | |
|---|---|---|
| 691,548 | Johnson | Jan. 21, 1902 |
| 1,983,827 | Winther et al. | Dec. 11, 1934 |
| 2,463,100 | Gredell | Mar. 1, 1949 |
| 2,488,892 | Arzt | Nov. 22, 1949 |
| 2,641,137 | Orcutt et al. | June 9, 1953 |
| 2,694,937 | Birbaum | Nov. 23, 1954 |
| 2,696,282 | Van Ausdall | Dec. 7, 1954 |
| 2,860,519 | Cavanaugh | Nov. 18, 1958 |